(12) United States Patent
Nishi et al.

(10) Patent No.: US 8,391,623 B2
(45) Date of Patent: Mar. 5, 2013

(54) IMAGE PROCESSING APPARATUS AND IMAGE PROCESSING METHOD FOR DETERMINING MOTION VECTORS

(75) Inventors: Tomohiro Nishi, Tokyo (JP); Kazuhiko Nishibori, Kanagawa (JP); Shintaro Okada, Tokyo (JP); Toshinori Ihara, Tokyo (JP)

(73) Assignee: Sony Corporation, Tokyo (JP)

( * ) Notice: Subject to any disclaimer, the term of this patent is extended or adjusted under 35 U.S.C. 154(b) by 931 days.

(21) Appl. No.: 12/486,094

(22) Filed: Jun. 17, 2009

(65) Prior Publication Data

US 2009/0310876 A1 Dec. 17, 2009

(30) Foreign Application Priority Data

Jun. 17, 2008 (JP) ................. 2008-157666

(51) Int. Cl.
*G06K 9/36* (2006.01)
*G06K 9/46* (2006.01)
*H04N 7/12* (2006.01)
*H04N 11/02* (2006.01)
*H04N 11/04* (2006.01)

(52) U.S. Cl. .................. 382/236; 375/240.16
(58) Field of Classification Search .................. 382/236; 348/208.1, 208.4, 459.1; 375/240.16
See application file for complete search history.

(56) References Cited

U.S. PATENT DOCUMENTS

| | | | |
|---|---|---|---|
| 7,075,988 B2 * | 7/2006 | Lee et al. ................. | 348/459 |
| RE39,281 E * | 9/2006 | Yukitake et al. ......... | 375/240.16 |
| 7,333,641 B2 * | 2/2008 | Hara et al. ................. | 382/125 |
| 2004/0022419 A1 * | 2/2004 | Kesaniemi ................. | 382/107 |
| 2004/0258154 A1 | 12/2004 | Liu et al. | |
| 2007/0133686 A1 | 6/2007 | Lee et al. | |
| 2008/0031338 A1 * | 2/2008 | Sato et al. ................. | 375/240.16 |
| 2008/0180535 A1 * | 7/2008 | Habuka et al. ............ | 348/208.4 |
| 2011/0129015 A1 * | 6/2011 | Nguyen et al. ........... | 375/240.16 |

FOREIGN PATENT DOCUMENTS

| | | |
|---|---|---|
| JP | 09-073540 | 3/1997 |
| JP | 2004-518339 | 6/2004 |
| JP | 2004-274628 | 9/2004 |
| JP | 3935500 | 3/2007 |
| KR | 2008-0032491 | 4/2008 |

(Continued)

OTHER PUBLICATIONS

English translation of Tachikawa (JP-09073540).*

(Continued)

*Primary Examiner* — Yubin Hung
(74) *Attorney, Agent, or Firm* — Finnegan, Henderson, Farabow, Garrett & Dunner, L.L.P.

(57) ABSTRACT

An image processing apparatus includes a motion vector detection unit configured to detect a motion vector at a predetermined space position of a frame at a predetermined time from an input image of a plurality of temporally different frames and obtain a reliability of the motion vector; a motion vector evaluation unit configured to obtain, at each space position, an evaluation value of the motion vector at the space position that is within a predetermined range including a subject space position that is a space position of interest, on the basis of the reliability at the space position and a distance from the subject space position; and a motion vector correction unit configured to correct the motion vector at the subject space position on the basis of the evaluation value and the motion vector at the space position of the predetermined range.

8 Claims, 5 Drawing Sheets

FOREIGN PATENT DOCUMENTS

| WO | WO 01/35657 A1 | 5/2001 |
|---|---|---|
| WO | WO 2004/039074 A1 | 5/2004 |
| WO | WO 2008/009981 A1 | 1/2008 |

OTHER PUBLICATIONS

K. Habuka et al., "Motion Vector Calculation Method, Hand-Movement Correction Device Using the Method, Imaging Device, and Motion Picture Generation Device", Abstract of WO 2006/075394 dated Jul. 20, 2006.

European Search Report from the European Patent Office in European Application No. 09251508.9, (Jun. 24, 2010).

* cited by examiner

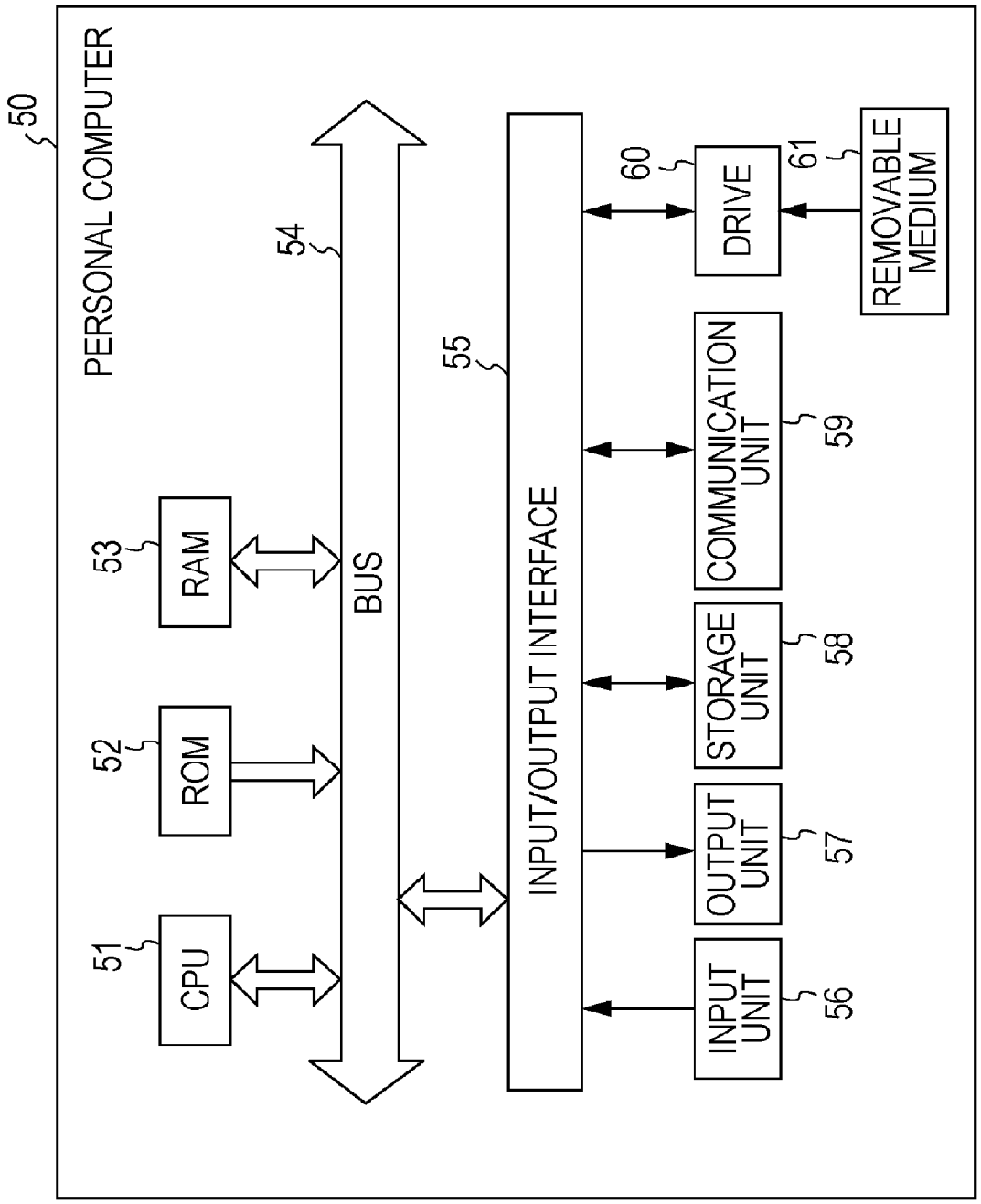

IMAGE PROCESSING APPARATUS AND IMAGE PROCESSING METHOD FOR DETERMINING MOTION VECTORS

BACKGROUND OF THE INVENTION

1. Field of the Invention

The present invention relates to an image processing apparatus, an image processing method, and a program. More particularly, the present invention relates to an image processing apparatus, an image processing method, and a program that are capable of detecting the motion vector of a moving image with high accuracy.

2. Description of the Related Art

In the related art, image processing apparatuses that determine a motion vector from a plurality of temporally different frames of a moving image, perform motion compensation using the motion vector, and generate an interpolation frame exist (see, for example, Japanese Unexamined Patent Application Publication No. 2004-518339). In such image processing apparatuses, by generating new interpolation frames, a moving image can be viewed more smoothly. For example, it is possible to generate an image at 60 Hz from an image at 30 Hz.

As a method of detecting a motion vector, for example, a block matching method exists. In the block matching method, in a case where a certain block of an f-th frame is set as a subject block, an (f+1)-th frame is set as a reference frame that is referred to for the detection of a motion vector, and a motion vector that is directed from the (f+1)-th frame toward the f-th frame is detected as the motion vector of the subject block, a predetermined range in which the position corresponding to the subject block of the (f+1)-th frame is the center is set as a search range in which a search for the motion vector is performed.

Then, blocks of the same size as the subject block are sequentially selected as candidate blocks that are candidates of the matching result of the subject block from the search range of the (f+1)-th frame, and the subject block is matched with the candidate blocks, thereby obtaining a difference for each pixel. Next, the grand total (hereinafter referred to as a difference absolute value sum) of the absolute value of the difference for each pixel with regard to all the pixels of the subject block is obtained.

Then, when the difference absolute value sum is obtained with regard to all the candidate blocks that can be selected in the search range, a candidate block in which the difference absolute value sum is minimized among the candidate blocks that can be selected in the search range is selected, and a vector that is directed from the subject block toward the candidate block is detected as the motion vector of the subject block.

SUMMARY OF THE INVENTION

As described above, by using the block matching method or the like, it is possible to detect a motion vector. However, in the vicinity of a boundary of objects with different motions, there is a case in which it is difficult to accurately detect a motion vector when compared to a portion in which the boundary is not contained.

The reason for this is that, for example, in a case where the block matching method is used, in a subject block (hereinafter referred to as a boundary block) containing a boundary between objects with different motions, a candidate block in which the difference absolute value sum is minimized does not correspond to an actual motion vector due to an influence of the appearance or concealment of an object or a different motion of another object.

Then, in a case where it is difficult to accurately detect a motion vector, when an image processing apparatus performs motion compensation by using a motion vector and generates an interpolation frame, an artifact called a halo may occur in the vicinity of the boundary between objects in motion of a moving image after interpolation. This halo causes the quality of the moving image after interpolation to be decreased. As a consequence, in order to improve the quality of a moving image, it is necessary to accurately detect a motion vector.

It is desirable to be capable of detecting the motion vector of a moving image with high accuracy.

According to an embodiment of the present invention, there is provided an image processing apparatus including motion vector detection means for detecting a motion vector at a predetermined space position of a frame at a predetermined time from an input image of a plurality of temporally different frames and for obtaining a reliability of the motion vector; motion vector evaluation means for obtaining, at each space position, an evaluation value of the motion vector at the space position that is within a predetermined range including a subject space position that is a space position of interest, on the basis of the reliability at the space position and a distance from the subject space position; and motion vector correction means for correcting the motion vector at the subject space position on the basis of the evaluation value and the motion vector at the space position of the predetermined range.

According to another embodiment of the present invention, there is provided an image processing method for use with an image processing apparatus for processing an input image, the image processing method including the steps of: detecting a motion vector at a predetermined space position of a frame at a predetermined time from an input image of a plurality of temporally different frames and obtaining a reliability of the motion vector; obtaining, at each space position, an evaluation value of the motion vector at the space position that is within a predetermined range including a subject space position that is a space position of interest, on the basis of the reliability at the space position and a distance from the subject space position; and correcting the motion vector at the subject space position on the basis of the evaluation value and the motion vector at the space position of the predetermined range.

According to another embodiment of the present invention, there is provided a program for causing a computer to function as an image processing apparatus including: motion vector detection means for detecting a motion vector at a predetermined space position of a frame at a predetermined time from an input image of a plurality of temporally different frames and for obtaining a reliability of the motion vector; motion vector evaluation means for obtaining, at each space position, an evaluation value of the motion vector at the space position that is within a predetermined range including a subject space position that is a space position of interest, on the basis of the reliability at the space position and a distance from the subject space position; and motion vector correction means for correcting the motion vector at the subject space position on the basis of the evaluation value and the motion vector at the space position of the predetermined range.

In an embodiment of the present invention, a motion vector at a predetermined space position of a frame at a predetermined time is detected from an input image of a plurality of temporally different frames. Also, the reliability of the motion vector is determined. A reliability of the motion vector at a space position that is of interest in a predetermined range including the subject space position that is a space position of interest is determined for each space position on the basis of the reliability at the space position and the distance from the subject space position. On the basis of the evaluation value and the motion vector at the space position in the predetermined range, the motion vector at the subject space position is corrected.

As described above, according to embodiments of the present invention, it is possible to detect the motion vector of a moving image with high accuracy.

BRIEF DESCRIPTION OF THE DRAWINGS

FIG. 5 is a block diagram showing an example of the configuration of a personal computer.

DESCRIPTION OF THE PREFERRED EMBODIMENTS

Figure 1:
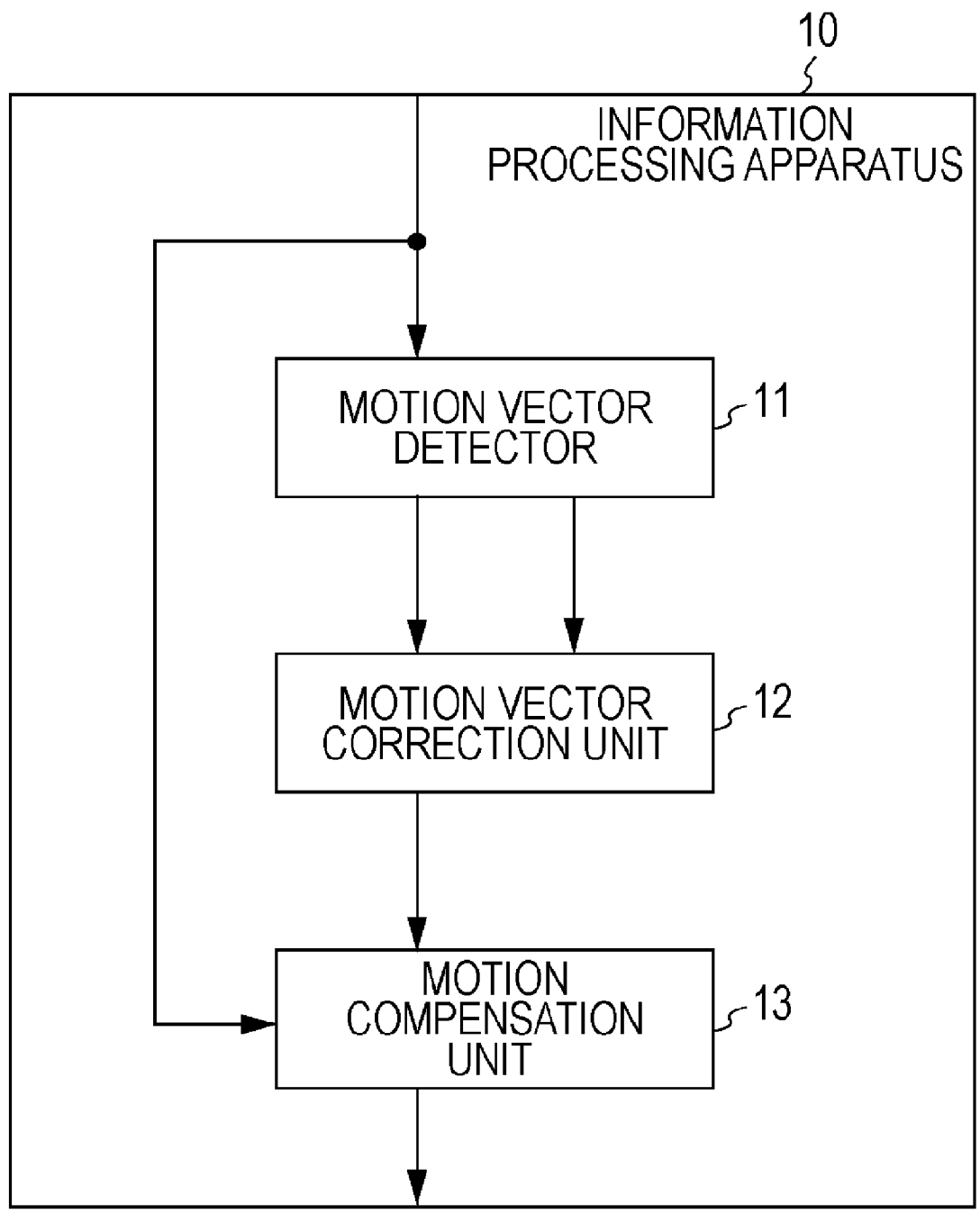
FIG. 1 is a block diagram showing an example of the configuration of an embodiment of an image processing apparatus to which the present invention is applied.

FIG. 1 shows an example of the configuration of an embodiment of an image processing apparatus to which the present invention is applied.

An image processing apparatus 10 of FIG. 1 includes a motion vector detector 11, a motion vector correction unit 12, and a motion compensation unit 13. The image processing apparatus 10 performs motion compensation on a moving image in units of frames, which is input as an input image, thereby outputting a high-quality output image.

The motion vector detector 11 detects the motion vector at a predetermined space position of a frame at a predetermined time from an input image of a plurality of temporally different frames.

More specifically, the motion vector detector 11 stores the input image input from the outside in units of frames. Furthermore, by using the input image of a frame (hereinafter referred to as a current frame) at a predetermined time, which is currently input, and a stored input image of a frame (hereinafter referred to as a past frame) previous to the frame, the motion vector detector 11 performs block matching or the like on each pixel, thereby detecting the motion vector of each pixel of the past frame. In the following, the motion vector of the pixel at the space position (i, j), which is detected by the motion vector detector 11, is represented as $V_0(i, j)$.

Furthermore, the motion vector detector 11 obtains the reliability $C(i, j)$ of each motion vector $V_0(i, j)$ from the input image. More specifically, on the basis of, for example, a difference absolute value sum $D(i, j)$ between the subject block corresponding to the motion vector $V_0(i, j)$ and a candidate block, the motion vector detector 11 obtains reliability $C(i, j)$ on the basis of the following Expression (1):

$$C(i,j)=F(D(i,j)) \quad (1)$$

With Expression (1), it is possible to obtain reliability $C(i, j)$ for each pixel. In Expression (1), F represents a predetermined function. For the function F, various kinds of functions can be used. For example, it is possible to obtain a difference absolute value sum $D(i, j)$ by setting it as reliability $C(i, j)$ as is or it is possible to obtain reliability $C(i, j)$ by setting a threshold value and normalizing a difference absolute value sum $D(i, j)$.

In the following, it is assumed in Expression (1) that a function F is used such that the smaller the difference absolute value sum $D(i, j)$, the greater the reliability $C(i, j)$. In this case, the greater the reliability $C(i, j)$, the more reliability increases, and the smaller the reliability $C(i, j)$, the more reliability decreases.

The motion vector correction unit 12 corrects the motion vector $V_0(i, j)$ on the basis of the motion vector $V_0(i, j)$ and neighboring motion vectors $V_0(i+m, j+n)$ detected by the motion detector 11 and the reliability $C(i, j)$ and neighboring reliabilities $C(i+m, j+n)$. Then on the basis of the reliability $C(i, j)$, the motion vector correction unit 12 supplies, as a motion vector $V_2(i, j)$, a corrected motion vector $V_1(i, j)$ or the motion vector $V_0(i, j)$ before correction to the motion compensation unit 13.

The motion compensation unit 13 stores the input image input from the outside in units of frames. Furthermore, the motion compensation unit 13 performs motion compensation by using the input image of the stored past frame and the motion vector $V_2(i, j)$ supplied from the motion vector correction unit 12, and generates an interpolation image at a time between the past frame and the present frame. Then, the motion compensation unit 13 outputs, as an output image, an image obtained by interpolation using an interpolation image.

Figure 2:
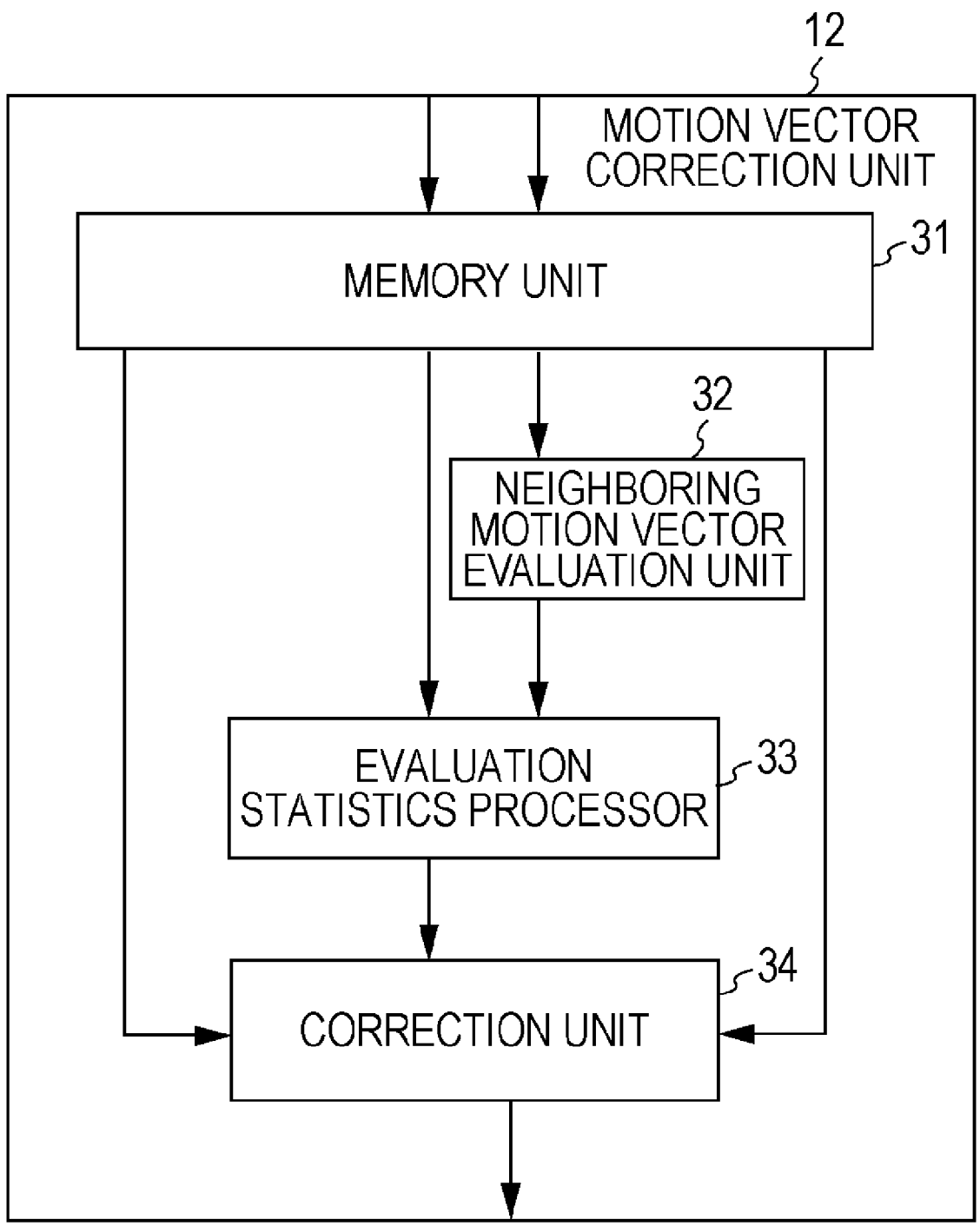
FIG. 2 is a block diagram showing an example of the detailed configuration of a motion vector correction unit of FIG. 1.

Next, FIG. 2 shows an example of the detailed configuration of the motion vector correction unit 12 of FIG. 1.

As shown in FIG. 2, the motion vector correction unit 12 includes a memory unit 31, a neighboring motion vector evaluation unit 32, an evaluation statistics processor 33, and a correction unit 34.

The memory unit 31 stores the motion vector $V_0(i, j)$ supplied from the motion vector detector 11 and the reliability $C(i, j)$ of the motion vector.

The neighboring motion vector evaluation unit 32 sequentially sets each of the pixels of the input image as a subject pixel. Then, the neighboring motion vector evaluation unit 32 reads, from the memory unit 31, the reliability $C(i+m, j+n)$ of the pixels (hereinafter referred to as neighboring pixels) at a space position $(i+m, j+n)$ ($m=0, \pm 1, \pm 2, \ldots, \pm M$; $n=0, \pm 1, \pm 2, \ldots, \pm N$; and M and N are natural numbers) of a predetermined range including a space position (hereinafter referred to as a subject space position) $(i, j)$ of a subject pixel. M and N may be the same or may differ from each other. That is, the range of the neighboring pixels with respect to the subject pixel may differ between the x direction (horizontal direction) and the y direction (vertical direction).

On the basis of the reliability $C(i+m, j+n)$ of the neighboring pixels read from the memory unit 31 and the relative distance $(m, n)$ from the subject pixel of the neighboring pixels, the neighboring motion vector evaluation unit 32 obtains the evaluation value $P(i+m, j+n)$ of the motion vector $V_0(i+m, j+n)$ for each of the neighboring pixels on the basis of Expression (2) described below:

$$P(i+m,j+n)=C(i+m,j+n)\times W(m,n) \quad (2)$$

In Expression (2), $W(m, n)$ represents a weight corresponding to the relative distance $(m, n)$. With Expression (2), the evaluation value $P(i+m, j+n)$ is obtained by performing weighting corresponding to the relative distance $(m, n)$ on the reliability $C(i+m, j+n)$.

The weight $W(m, n)$ can take any value as long as it corresponds to the relative distance $(m, n)$; here, an inverse of the relative distance $(m, n)$ is used. In this case, the evaluation value P(i+m, j+n) increases with respect to the motion vector $V_0$(i+m, j+n) which is nearer and has a higher reliability C(i+m, j+n).

The evaluation statistics processor 33 (motion vector correction means) reads the motion vector $V_0$(i+m, j+n) of the neighboring pixels from the memory unit 31. The evaluation statistics processor 33 corrects the motion vector $V_0$(i, j) of the subject pixel on the basis of the motion vector $V_0$(i+m, j+n) of the neighboring pixels and the evaluation value P(i+m, j+n) of the neighboring pixels, which is obtained by the neighboring motion vector evaluation unit 32 so as to obtain the corrected motion vector $V_1$(i, j)

More specifically, by using the motion vector $V_0$(i+m, j+n) of the neighboring pixel and the evaluation value P(i+m, j+n) of the neighboring pixel, the evaluation statistics processor 33 obtains a corrected motion vector $V_1$(i, j) on the basis of Expression (3) described below:

$$V_1(i,j) = \frac{\sum_{m=-M}^{M}\sum_{n=-N}^{N}(P(i+m,j+n) \times V_0(i+m,j+n))}{\sum_{m=-M}^{M}\sum_{n=-N}^{N}P(i+m,j+n)} \quad (3)$$

With Expression (3), the corrected motion vector $V_1$(i, j) is obtained by dividing the grand total of the products of the values of the motion vector $V_0$(i+m, j+n) and the evaluation value P(i+m, j+n) of the neighboring pixels by the grand total of the values of the evaluation value P(i+m, j+n).

The evaluation value P(i+m, j+n) may be accumulated for each value of the motion vector $V_0$(i+m, j+n) of the neighboring pixels, and the value of the motion vector $V_0$(i+m, j+n) at which the accumulated value is at a maximum may be set as a corrected motion vector value $V_1$(i, j). In this case, the accumulations may be performed separately for the horizontal direction and the vertical direction independently of each other or may be performed in common.

Furthermore, by using the weight W(m, n) of Expression (2), only the motion vector $V_0$(i+m, j+n) in one direction may be used for the correction of the motion vector $V_0$(i, j) For example, in the horizontal direction, the weight W(m, n) with respect to the reliability C(i+m, j+n) of the neighboring pixels positioned on either the right side or the left side of the subject pixel is set as a weight corresponding to the relative distance (m, n), and the weight W(m, n) with respect to the reliability C(i+m, j+n) of the neighboring pixel positioned on the other side is set as 0. As a result, all the evaluation values P(i+m, j+n) of the neighboring pixels positioned on the other side become 0. Therefore, the motion vector $V_0$(i+m, j+n) of the neighboring pixels is not used for the correction of the motion vector $V_0$(i, j) on the basis of Expression (3).

As a method for selecting one of the right side and the left side, for example, there is a method in which the differentiated value of the reliability C(i+m, j+n) of the neighboring pixels in the horizontal direction is obtained, and the side in which the reliability C(i+m, j+n) increases more is selected using the differentiated value. According to this method, it is possible to use only the more reliable motion vector $V_0$(i+m, j+n) and the neighboring pixels for the correction of the motion vector $V_0$(i, j). In this method, since the direction for which reliability should be higher is determined on the basis of the differentiated value, the determination is easy.

On the basis of the reliability C(i, j) of the subject pixel, the correction unit 34 (output means) determines the motion vector $V_2$(i, j) used for motion compensation by the motion compensation unit 13 from the corrected motion vector $V_1$(i, j) determined by the reliability evaluation statistics processor 33 and the motion vector $V_0$(i, j) before correction, and outputs the motion vector $V_2$(i, j) to the motion compensation unit 13.

More specifically, the correction unit 34 reads the reliability C(i, j) of the subject pixel from the memory unit 31 and determines whether or not the reliability C(i, j) is greater than or equal to a predetermined threshold value. Then, on the basis of the determination result, the correction unit 34 determines the corrected motion vector $V_1$(i, j) or the motion vector $V_0$(i, j) before correction as a motion vector $V_2$(i, j).

In a case where the reliability C(i, j) is lower than the predetermined threshold value, the correction unit 34, by using the reliability C(i, j), may perform a blending process on the motion vector $V_0$(i, j) before correction and the corrected motion vector $V_1$(i, j) so as to obtain the motion vector $V_2$(i, j) on the basis of Expression (4) described below:

$$V_2(i,j) = (C(i,j) \times V_0(i,j) + (C\max - C(i,j)) \times V(i,j))/C\max \quad (4)$$

where Cmax represents the maximum value of the reliability that can be obtained.

Furthermore, the correction unit 34 may determine the corrected motion vector $V_1$(i, j) as the motion vector $V_2$(i, j) as is.

As described above, the image processing apparatus 10 corrects the motion vector $V_0$(i, j) of the subject pixel by using the motion vector $V_0$(i+m, j+n) of the neighboring pixels. Therefore, in the image processing apparatus 10, for example, the motion vector $V_0$(i, j) of the subject pixel corresponding to the boundary block for which it is difficult to accurately detect the motion vector by block matching is corrected by using a motion vector having a high reliability, which is obtained by using the subject block other than the boundary block in the vicinity thereof. As a result, in the subject pixel corresponding to the boundary block, also, it is possible to detect a motion vector with high accuracy. As a result, it is possible to reduce a halo that occurs in the output image and improve the quality of the output image.

Figure 3:
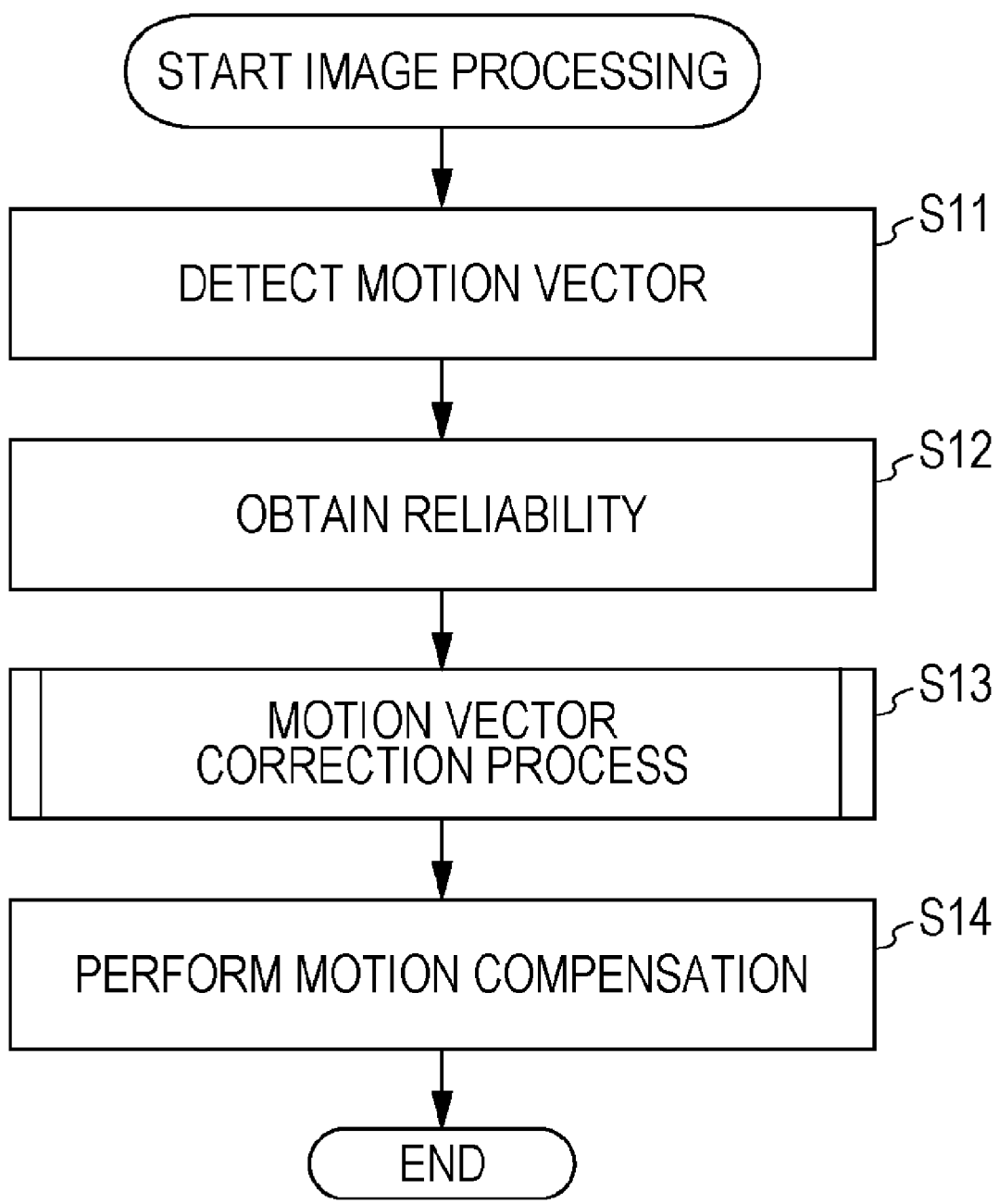
FIG. 3 is a flowchart illustrating image processing.

Next, a description will be given, with reference to the flowchart of FIG. 3, of image processing performed by the image processing apparatus 10 of FIG. 1. This image processing is started, for example, each time the input image of each frame is input.

In step S11, the motion vector detector 11 performs block matching on each pixel by using the input image of the current frame and the input image of the past frame so as to detect the motion vector $V_0$(i, j) of each pixel of the past frame. This motion vector $V_0$(i, j) is supplied to the motion vector correction unit 12 and is stored in the memory unit 31 (FIG. 2).

In step S12, the motion vector detector 11 obtains the reliability C(i, j) of each motion vector $V_0$(i, j) from the input image. This reliability C(i, j) is supplied to the motion vector correction unit 12 and is stored in the memory unit 31.

In step S13, on the basis of the motion vector $V_0$(i, j) supplied from the motion vector detector 11 and the reliability C(i, j), the motion vector correction unit 12 performs a motion vector correction process for correcting the motion vector $V_0$(i, j). The details of this motion vector correction process will be described with reference to FIG. 4 (to be described later).

In step S14, the motion compensation unit 13 performs motion compensation by using the input image of the past frame and the motion vector $V_2$(i, j) supplied from the motion vector correction unit 12 as a result of the motion vector correction process of step S13, and generates an interpolation image at a time between the past frame and the current frame.

Then, the motion compensation unit 13 outputs, as an output image, the image obtained by interpolating the input image using an interpolation image.

Figure 4:
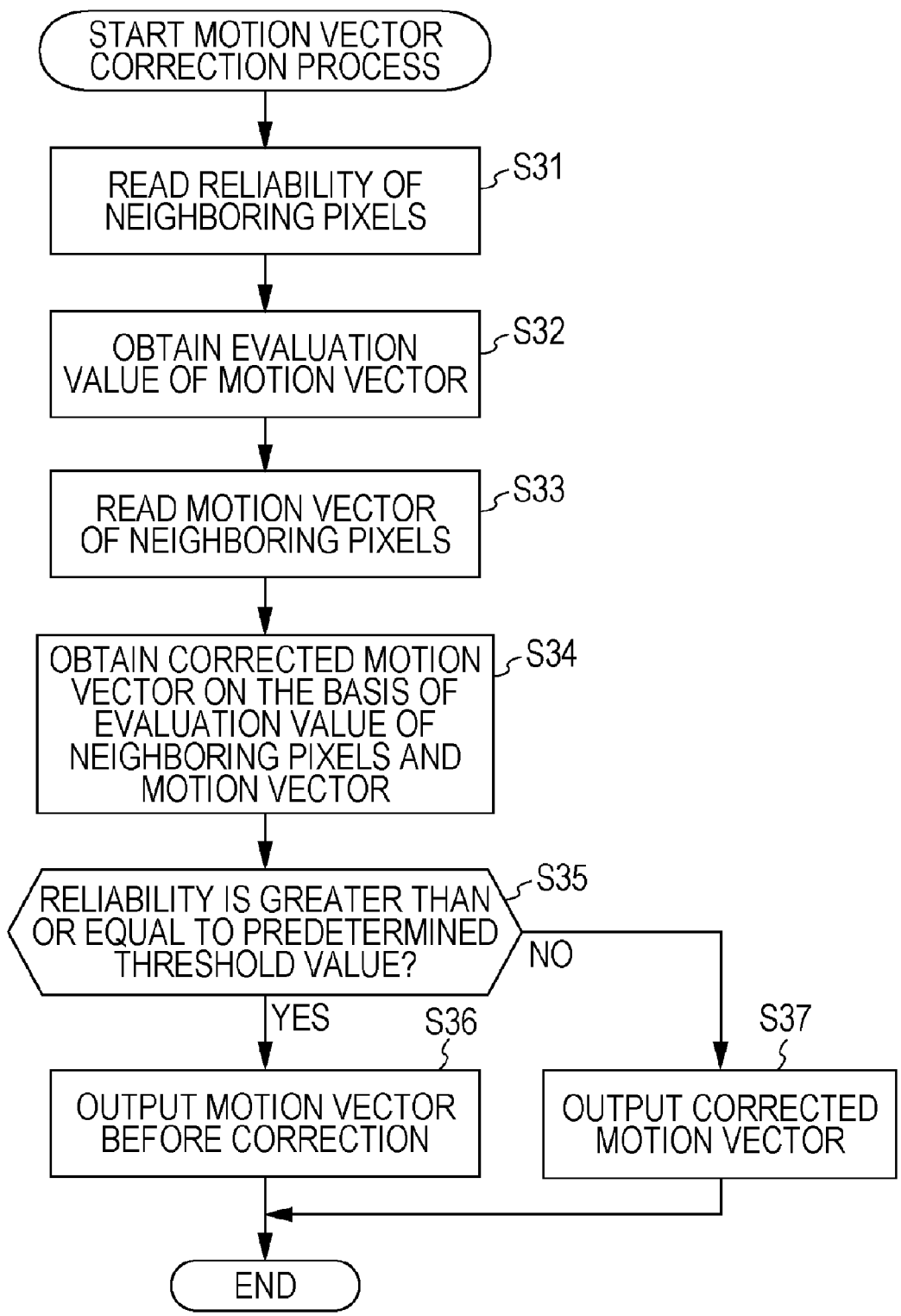
FIG. 4 is a flowchart illustrating a motion vector correction process.

Next, a description will be given, with reference to the flowchart of FIG. 4, of the motion vector correction process of step S13 in FIG. 3.

In step S31, the neighboring motion vector evaluation unit 32 sequentially uses each of the pixels of the input image as a subject pixel and reads the reliability C(i+m, j+n) of the neighboring pixels from the memory unit 31. In step S32, on the basis of the reliability C(i+m, j+n) of the motion vector, which is read from the memory unit 31, and the relative distance (m, n) from the subject pixel of the pixels in the vicinity thereof, the neighboring motion vector evaluation unit 32 obtains the evaluation value P(i+m, j+n) of the motion vector $V_0$(i+m, j+n) for each neighboring pixel on the basis of Expression (2) described above.

In step S33, the evaluation statistics processor 33 reads the motion vector $V_0$(i+m, j+n) of the neighboring pixels from the memory unit 31. In step S34, on the basis of the evaluation value P(i+m, j+n) of the neighboring pixels, which is obtained by the neighboring motion vector evaluation unit 32, and the read motion vector $V_0$(i+m, j+n) of the neighboring pixels, the evaluation statistics processor 33 corrects the motion vector $V_0$(i, j) on the basis of Expression (3) described above so as to obtain the corrected motion vector value $V_1$(i, j).

In step S35, the correction unit 34 reads the reliability C(i, j) of the subject pixel from the memory unit 31 and determines whether or not the reliability C(i, j) is greater than or equal to a predetermined threshold value. When it is determined in step S35 that the reliability C(i, j) is greater than or equal to the predetermined threshold value, in step S36, the correction unit 34 determines the motion vector $V_0$(i, j) before correction as the motion vector $V_2$(i, j) and outputs it to the motion compensation unit 13.

On the other hand, when it is determined in step S35 that the reliability C(i, j) is not greater than or equal to the predetermined threshold value, in step S37, the correction unit 34 determines the corrected motion vector $V_1$(i, j) as a motion vector $V_2$(i, j) and outputs it to the motion compensation unit 13. Then, the process returns to step S13 of FIG. 3, and the process of step S14 is performed.

In the above-described description, a motion vector has been obtained for each pixel. Alternatively, a motion vector may be determined in units of a plurality of pixels.

The above-described series of processing operations can be performed by hardware and also by software. When the series of processing operations is to be performed by software, a program constituting the software is installed from a program recording medium into a computer that is incorporated in specialized hardware or into, for example, a general-purpose computer, which is capable of performing various types of functions by installing various types of programs.

FIG. 5 is a block diagram showing an example of the configuration of the hardware of a personal computer 50 that performs the above-described series of processing operations in accordance with programs.

In the personal computer 50, a central processing unit (CPU) 51, a read-only memory (ROM) 52, and a random access memory (RAM) 53 are interconnected with one another via a bus 54.

Furthermore, an input/output interface 55 is connected to the bus 54. An input unit 56, an output unit 57, a storage unit 58, a communication unit 59, and a drive 60 are connected to the input/output interface 55. The input unit 56 includes a keyboard, a mouse, a microphone, a receiver for receiving a command transmitted from a remote controller, and the like.

The output unit 57 includes a display unit, a speaker, and the like. The storage unit 58 includes a hard disk, a non-volatile memory, and the like. The communication unit 59 includes a network interface and the like. The drive 60 drives a removable medium 61, which is a packaged medium composed of a magnetic disk (including a flexible disk), an optical disc (CD-ROM (Compact Disc-Read Only Memory), DVD (Digital Versatile Disc), etc.), a magneto-optical disc, or a semiconductor memory.

In the personal computer 50 configured as described above, for example, the CPU 51 loads a program stored in the storage unit 58 into the RAM 53 via the input/output interface 55 and the bus 54, and executes the program, thereby performing the above-described series of processing operations.

The program to be executed by the CPU 51 is provided by being recorded on the removable medium 61 or is provided via a wired or wireless transmission medium, such as a local area network, the Internet, or a digital satellite broadcast.

Then, the program can be installed into the storage unit 58 via the input/output interface 55 by installing the removable medium 61 into the drive 60. Furthermore, the program can be received by the communication unit 59 and installed into the storage unit 58 via a wired or wireless transmission medium. In addition, the program can be installed in advance in the ROM 52 and the storage unit 58.

In this specification, steps describing a program stored on a program recording medium may be processes that are performed in a time-series manner according to the written order, but also processes that are performed in parallel or individually although they may not be performed in a time-series manner.

The present application contains subject matter related to that disclosed in Japanese Priority Patent Application JP 2008-157666 filed in the Japan Patent Office on Jun. 17, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents hereof.

What is claimed is:

1. An image processing method for use with an image processing apparatus for processing an input image, the image processing method comprising the steps of:

detecting a motion vector at each of a plurality of space position within a predetermined range including a subject space position that is a space position of interest, of a frame at a predetermined time from an input image of a plurality of temporally different frames and obtaining a reliability of the motion vector;

obtaining, at each of the plurality of space positions, an evaluation value of the motion vector at the space position, on the basis of the reliability of the motion vector at the space position and a weighting corresponding to a distance from the subject space position; and correcting the motion vector at the subject space position on the basis of the evaluation values and the motion vectors at the plurality of space positions of the predetermined range, wherein the weightings of the space positions on one side of the subject space position is set to 0 when space positions on the other side of the subject space position has corresponding reliabilities that are higher than the reliabilities corresponding to the space positions of the one side.

2. An image processing apparatus comprising:
motion vector detection means for detecting a motion vector at each of a plurality of space positions within a predetermined range including a subject space position that is a space position of interest of a frame at a predetermined time from an input image of a plurality of temporally different frames and for obtaining a reliability of the motion vector;
motion vector evaluation means for obtaining, at each of the plurality of space positions, an evaluation value of the motion vector at the space position, on the basis of the reliability of the motion vector at the space position and a weighting corresponding to a distance from the subject space position; and
motion vector correction means for correcting the motion vector at the subject space position on the basis of the evaluation values and the motion vectors at the plurality of space positions of the predetermined range; wherein
the weightings of the space positions on one side of the subject space position is set to 0 when space positions on the other side of the subject space position has corresponding reliabilities that are higher than the reliabilities corresponding to the space positions of the one side.

3. The image processing apparatus according to claim 2, further comprising:
output means for outputting, on the basis of the reliability at the subject space position, the motion vector detected by the motion vector detection means or the motion vector corrected by the motion vector correction means, as a motion vector at the subject space position.

4. The image processing apparatus according to claim 3, further comprising:
motion compensation means for performing motion compensation using the input image of the frame at the predetermined time and the motion vector at the subject space position as output from the output means so as to generate an interpolation image.

5. An image processing apparatus comprising:
a motion vector detection unit configured to detect a motion vector at each of a plurality of space positions within a predetermined range including a subject space position that is a space position of interest of a frame at a predetermined time from an input image of a plurality of temporally different frames and obtain a reliability of the motion vector;
a motion vector evaluation unit configured to obtain, at each of the plurality of space positions, an evaluation value of the motion vector at the space position, on the basis of the reliability of the motion vector at the space position and a weighting corresponding to a distance from the subject space position; and
a motion vector correction unit configured to correct the motion vector at the subject space position on the basis of the evaluation values and the motion vectors at the plurality of space positions of the predetermined range, wherein
the weightings of the space positions on one side of the subject space position is set to 0 when space positions on the other side of the subject space position has corresponding that are higher than the reliabilities corresponding to the space positions of the one side.

6. The image processing apparatus according to claim 5, wherein the motion vector correction unit further configured to:
determine, on the basis of the reliability at the subject space position, the motion vector detected by the motion ector detection unit or the motion vector corrected by the motion vector correction unit, as a motion vector at the subject space position.

7. The image processing apparatus according to claim 6 further comprising:
a motion compensation unit configured to perform motion compensation using the input image of the frame at the predetermined and the motion vector at the subject space position as determined by the motion vector correction unit so as to generate an interpolation image.

8. A non-transitory computer readable medium storing instructions that when executed cause a computer to perform an image processing apparatus method, the method comprising:
a step that detects a motion vector at each of a plurality of space position within a predetermined range including a subject space position that is a space position of interest, of a frame at a predetermined time from an input image of a plurality of temporally different frames and for obtaining a reliability of the motion vector;
a step that obtains, at each of the plurality of space positions, an evaluation value of the motion vector at the space position, on the basis of the reliability of the motion vector at the space position and a weighting corresponding to a distance from the subject space position; and
a step that corrects the motion vector at the subject space position on the basis of the evaluation values and the motion vectors at the plurality of space positions of the predetermined range, wherein
the weighting of the space positions on one side of the subject space position is set to 0 when space positions on the other side of the subject space position has corresponding reliabilities that are higher than the reliabilities corresponding to the space positions of the one side.

* * * * *